US012045200B2

(12) United States Patent
Hasan et al.

(10) Patent No.: US 12,045,200 B2
(45) Date of Patent: Jul. 23, 2024

(54) SYSTEM AND METHOD FOR CONTENT CURATION AND COLLABORATION

(71) Applicant: Quantiphi Inc, Marlborough, MA (US)

(72) Inventors: Asif Hasan, Marlborough, MA (US);
Saurabh Mishra, Marlborough, MA (US); Biplab Mahadani, Mumbai (IN); Abhishek Patra, Mumbai (IN); Shubham Swastik Behera, Mumbai (IN); Eshan Tyagi, Mumbai (IN); Aniket Mohite, Mumbai (IN); Siddharth Singh, Mumbai (IN); Sanket Avinash Jejurkar, Mumbai (IN)

( * ) Notice: Subject to any disclaimer, the term of this patent is extended or adjusted under 35 U.S.C. 154(b) by 151 days.

(21) Appl. No.: 17/809,008

(22) Filed: Jun. 26, 2022

(65) Prior Publication Data

US 2023/0195693 A1   Jun. 22, 2023

Related U.S. Application Data

(60) Provisional application No. 63/291,657, filed on Dec. 20, 2021.

(51) Int. Cl.
G06F 16/17        (2019.01)

(52) U.S. Cl.
CPC .............. *G06F 16/1727* (2019.01)

(58) Field of Classification Search
None
See application file for complete search history.

(56) References Cited

U.S. PATENT DOCUMENTS

| | | | |
|---|---|---|---|
| 7,546,533 B2 | 6/2009 | Sareen et al. | |
| 10,642,888 B2 | 5/2020 | Nauerz et al. | |
| 10,681,503 B2* | 6/2020 | Lisewski | H04W 80/10 |
| 11,202,177 B2* | 12/2021 | Lisewski | H04W 12/06 |
| 11,263,257 B2* | 3/2022 | Breymann | G06F 16/54 |
| 11,449,584 B1* | 9/2022 | Pamucci | H04L 9/0897 |
| 11,770,260 B1* | 9/2023 | Pamucci | H04N 21/8358 |
| 11,790,635 B2* | 10/2023 | Watanabe | G06V 10/462 |
| | | | 382/159 |
| 2015/0234844 A1* | 8/2015 | Cardonha | G06F 16/9535 |
| | | | 707/752 |
| 2018/0032259 A1* | 2/2018 | Yook | H04L 67/10 |
| 2020/0084587 A1* | 3/2020 | Lisewski | H04L 67/141 |
| 2020/0183968 A1* | 6/2020 | Breymann | G11B 27/031 |
| 2020/0260234 A1* | 8/2020 | Lisewski | H04L 67/141 |

(Continued)

FOREIGN PATENT DOCUMENTS

EP            3301589 A1       4/2018

*Primary Examiner* — Kim T Nguyen
(74) *Attorney, Agent, or Firm* — RC Trademark Company

(57) ABSTRACT

The present disclosure discloses a system for content curation and collaboration. The system comprises a database arrangement configured to store an uncurated and/or a curated content and a data processing arrangement communicably coupled to the database arrangement. The data processing arrangement is configured to enable secured access of a user to the uncurated and/or the curated content stored in the database arrangement, identify at least one content relevant to the user from the uncurated and/or the curated content stored in the database arrangement based on at least one input received from the user, and provide the relevant content to the user in a desired format.

38 Claims, 6 Drawing Sheets

(56) References Cited

U.S. PATENT DOCUMENTS

| | | | |
|---|---|---|---|
| 2021/0350509 A1* | 11/2021 | Park | G06T 5/90 |
| 2022/0284695 A1* | 9/2022 | Watanabe | G06F 16/532 |
| 2023/0195693 A1* | 6/2023 | Hasan | G06F 16/252 |
| | | | 707/822 |

* cited by examiner

SYSTEM AND METHOD FOR CONTENT CURATION AND COLLABORATION

TECHNICAL FIELD

The present disclosure is generally related to a system for processing content; and more specifically, to a system for content curation and collaboration. Furthermore, the present disclosure also relates to a method for content curation and collaboration.

BACKGROUND

The knowledge-dominated businesses create a lot of knowledge and content pertaining to various topics, projects, issues, themes, and so on for their internal and external use over a long period of time. The identification of relevant content from the content generated by the employees over a long period of time becomes an extremely tedious and mammoth process. In addition to this, the structured and organized storage of this vast amount of content is a complicated and intricate process. Furthermore, the efficient management of this vast amount of content is also a complicated process.

However, if implemented correctly, the content management process significantly enhances the productivity of the people and businesses involved with the content and the quality of operations being carried out by the people involved with the content.

In addition to this, the identification and curation of content relevant to the user's requirement also becomes a time-consuming and error-prone process as it is done manually. For curation of the relevant content, the content is tagged manually such that the tags can be used later to determine the relevant content based on the user's requirements. Furthermore, the manual process of content curation is also exceptionally dependent on the human talent and trainings, required for the manual curation of relevant content.

The manual process of content curation also lacks capabilities to capture user feedback and modify the content based on the received user feedback. Even if the user's feedback is to be captured manually, it would be a complicated and intricate process. Also, the manual process of updating the outdated content to a newer version such that the content is updated for every user is prone to errors. Furthermore, the possibility of creating multiple versions of the same content and not updating the outdated content, where the user is not able to access the latest updated version of the relevant content, is also very high. Such a manual process of content management becomes more complicated in a business environment wherein different teams have to collaborate cross-functionally in their day-to-day operations.

Therefore, there exists a need of a system for content curation and collaboration that is capable of automated content curation, content tagging, and user feedback capturing to generate user required content as the present systems and methods are not capable of automated content curation, collaboration, and updating the content based on the user feedback.

SUMMARY

The present disclosure seeks to provide a system and method for content curation and collaboration.

The object of the present disclosure is to provide a system and method for content curation and collaboration that overcomes at least partially the problems encountered in the prior art. Moreover, the present disclosure seeks to provide at least a partial solution to an existing technical problem of automatically curating the relevant content to a user as per his requirements.

In an aspect, embodiments of the present disclosure provide a system of content curation and collaboration, the system comprising:

a database arrangement configured to store a uncurated and/or a curated content, using a user interface, wherein the uncurated and curated content is segregated before being stored; and a data processing arrangement communicably coupled to the database arrangement, wherein the data processing arrangement is configured to:

enable, secured access of a user to the uncurated and/or the curated content stored in the database arrangement based on pre-defined rights of the user;

identify, at least one content relevant to the user, from the uncurated and/or the curated content stored in the database arrangement, via an index stored in a search database, in response to the at least one input received from the user, wherein the index comprises of association between a plurality of content, a plurality of associated metadata and a plurality of associated thumbnails;

compile, the content relevant to the user at a target location; and provide, the relevant content to the user in a desired format via the user interface.

The present disclosure is advantageous in terms of providing efficient, accurate, and automated relevant content curation, content tagging, user feedback capturing, and modifying the content based on the user feedback.

Optionally, the data processing arrangement is configured to store the index in one or more elastic search databases.

Optionally, the plurality of content comprises at least one of curated and uncurated content.

Optionally, the data processing arrangement identifies the relevant content from the curated and/or the uncurated content via fuzzy logic.

Optionally, the data processing arrangement enables the user to perform at least one of actions comprising addition, modification and deletion of the curated and/or uncurated content stored in the database arrangement.

Optionally, at least one of the actions performed by the data processing arrangement triggers a SQL query at back-end of the database arrangement that updates the database arrangement.

Optionally, the data processing arrangement generates the plurality of thumbnails from the curated and/or the uncurated content stored in the database arrangement.

Optionally, the data processing arrangement generates the plurality of thumbnails by extracting one or more features of the curated and/or uncurated content via at least one of an object recognition algorithm, an image recognition algorithm and a text recognition algorithm.

Optionally, the data processing arrangement extracts the plurality of metadata by processing the generated plurality of thumbnails via vision API.

Optionally, the data processing arrangement receives the at least one user input in the form of user defined workflow pathways and provides output to the user in the desired format, wherein the defined user workflow pathways comprise uploading curated content, searching curated content and searching uncurated content.

Optionally, the data processing arrangement is configured to employ big query for storing and creating the index comprising of associations between the plurality of content, the plurality of associated metadata and the plurality of associated thumbnails.

Optionally, the data processing arrangement is configured to enable the user to upload the uncurated and/or the curated content on the user interface for storing the uncurated and/or the curated content in the database arrangement.

Optionally, the uncurated and/or the curated content is segregated manually.

Optionally, the data processing arrangement receives the input from the user using the user interface.

Optionally, the identification of content relevant to the user comprises searching the relevant content in the database arrangement using at least one of: predefined classification, keywords, and/or objects.

Optionally, the data processing arrangement receives a feedback from the user, wherein the feedback is used to modify the uncurated and/or the curated content stored in the database arrangement.

Optionally, the data processing arrangement receives a user's selection of at least one content from the uncurated and/or the curated content stored in the database arrangement to curate the content.

Optionally, the data processing arrangement dispatches a communication to the user with a target location of the curated content.

Optionally, the relevant content comprises a content required by the user and/or a content searched by the user.

In a second aspect, embodiments of the present disclosure describe a method for content curation and collaboration, the method comprising:

storing, using a user interface, a uncurated and/or a curated content in a database arrangement, wherein the uncurated and curated content is segregated before being stored;

providing, using a data processing arrangement, secured access of the uncurated and/or the curated content stored in the database arrangement, to the at least one user based on pre-defined rights of the at least one user;

receiving, using the user interface, at least one input from the at least one user;

identifying, using the data processing arrangement, at least one content relevant to the user, from the uncurated and/or the curated content stored in the database arrangement, via an index stored in a search database, in response to the at least one input received from the user, wherein the index comprises of association between a plurality of content, a plurality of associated metadata and a plurality of associated thumbnails;

compiling, using the data processing arrangement, the content relevant to the user at a target location; and providing, using the data processing arrangement, the relevant content to the user in a desired format via the user interface.

Optionally, the method comprises storing the index in one or more elastic search databases.

Optionally, the plurality of content comprises at least one of curated and uncurated content.

Optionally, the method comprises identifying the relevant content from the curated and/or uncurated content via fuzzy logic.

Optionally, the method comprises enabling the user to perform at least one of actions comprising adding, modifying and deleting the curated and/or uncurated content stored in the database arrangement.

Optionally, at least one of the actions performed by the data processing arrangement triggers a SQL query at backend of the database arrangement that updates the database arrangement.

Optionally, the method comprises generating the plurality of thumbnails from the curated and/or uncurated content stored in the database arrangement.

Optionally, the method comprises generating the plurality of thumbnails by extracting one or more features of the curated and/or uncurated content via at least one of an object recognition algorithm, an image recognition algorithm and a text recognition algorithm.

Optionally, the method comprises extracting the plurality of metadata by processing the generated plurality of thumbnails via vision API.

Optionally, the method comprises receiving user inputs in the form of defined user workflow pathways and provides output to the user in the desired format, wherein the user-defined workflow pathways comprise uploading curated content, searching curated content, and searching uncurated content.

Optionally, the method comprises employing big query for storing and creating the index comprising of associations between the plurality of content, the plurality of associated metadata and the plurality of associated thumbnails.

Optionally, the method comprises enabling the user to upload the uncurated and/or the curated content on the user interface for storing the uncurated and/or the curated content in the database arrangement.

Optionally, the uncurated and/or the curated content is segregated manually.

Optionally, the method comprises receiving the input from the user using the user interface.

Optionally, the identification of content relevant to the user comprises searching the relevant content in the database arrangement using at least one of: predefined classification, keywords, and/or objects.

Optionally, the method comprises receiving a feedback from the user, wherein the feedback is used to modify the uncurated and/or the curated content stored in the database arrangement.

Optionally, the method comprises receiving a user's selection of at least one content from the uncurated and/or the curated content stored in the database arrangement to curate the content.

Optionally, the method comprises dispatching a communication to the user with the target location of the curated content.

Optionally, the relevant content comprises a content required by the user and/or a content searched by the user.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
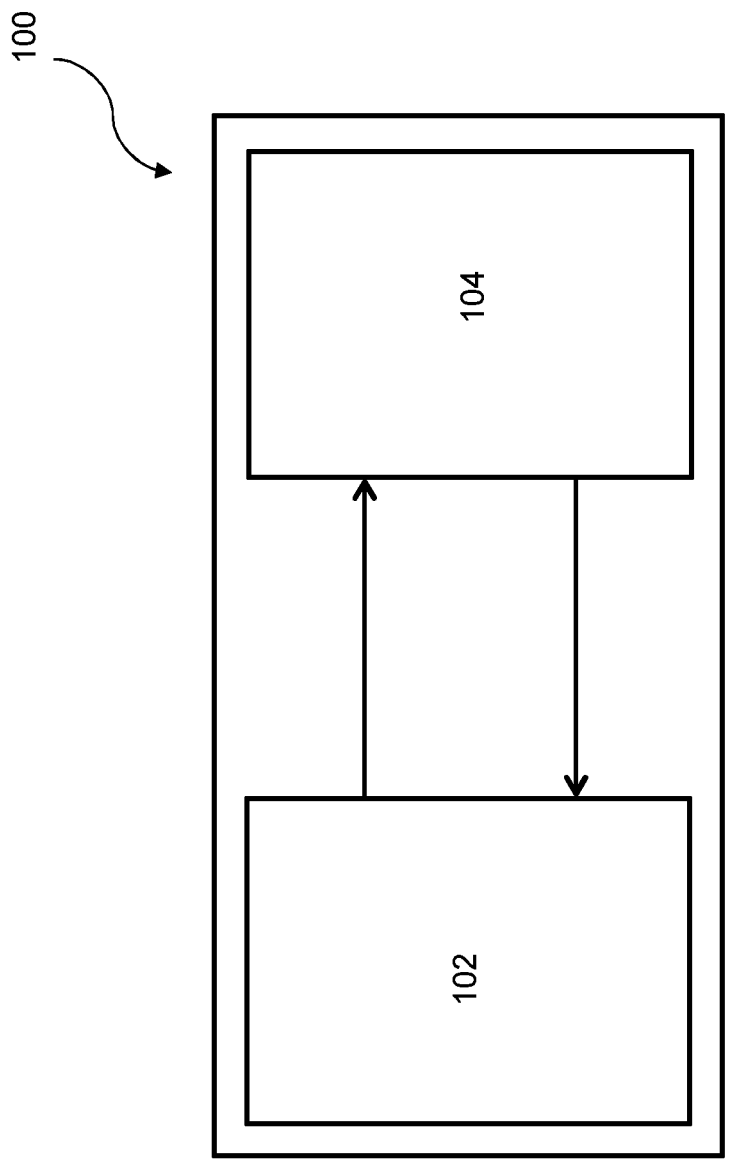
FIG. 1 is a schematic illustration of a system for content curation and collaboration, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and the ways in which they can be implemented. Although some modes of carrying out the present disclosure have been disclosed, those skilled in the art would recognize that other embodiments for carrying out or practicing the present disclosure are also possible.

The terms "a" and "an" herein do not denote a limitation of quantity, but rather denote the presence of at least one of the referenced items. The terms "having", "comprising", "including", and variations thereof signify the presence of a component.

In an aspect, embodiments of the present disclosure provide a system of content curation and collaboration, the system comprising:

a database arrangement configured to store a uncurated and/or a curated content, using a user interface, wherein the uncurated and curated content is segregated before being stored; and a data processing arrangement communicably coupled to the database arrangement, wherein the data processing arrangement is configured to:

enable, secured access of a user to the uncurated and/or the curated content stored in the database arrangement based on pre-defined rights of the user;

identify, at least one content relevant to the user, from the uncurated and/or the curated content stored in the database arrangement, via an index stored in a search database, in response to the at least one input received from the user, wherein the index comprises of association between a plurality of content, a plurality of associated metadata and a plurality of associated thumbnails;

compile, the content relevant to the user at a target location; and provide, the relevant content to the user in a desired format via the user interface.

The present disclosure provides the user with the relevant curated content based on the requirements. The system of the present disclosure can be used by corporates to enhance their cross-functional collaboration between the teams. The present system can be employed to automatically provide content in the user desired format based on the requirements of the user without putting any manual efforts in content curation. The system of the present disclosure enables effortless and efficient relevant content curation and updating. Furthermore, the system of the present disclosure efficiently captures the user's feedback for updating the content.

Throughout the present disclosure, the term "content" refers to any information presented in a user consumable format. The content may include information present in text files, presentation slides, portable document files, and so forth. Furthermore, the content may include information present on the internet in the form of the webpage and so on. Optionally, the content may include lists, tables, charts, graphs, slides, presentations, drawings, illustrations and so forth.

Throughout the present disclosure, the term "curation" refers to the action or process of selection, organization, and presentation of content or information to a user using professional or expert knowledge.

Throughout the present disclosure, the term "collaboration" refers to the action or process of working with someone to produce something.

Particularly, collaboration refers to working practice whereby at least two individuals work together for a common purpose to achieve any business benefit. Collaboration enables individuals to work together to achieve a defined and common business purpose.

Throughout the present disclosure, the term "system" refers to an integrated computing system with a plurality of components such as at least one input component, at least one output component, at least one database arrangement, and at least one data processing arrangement for automatic content curation and collaboration in the system.

Throughout the present disclosure, the term "database arrangement" refers to an arrangement of virtual or physical memory units capable of storing digital data files. Optionally, the database arrangement may be storage systems, such as but not limited to, a relational database such as IBM DB2®, and Oracle 9®. Alternatively, the database arrangement may be a cloud database such as but not limited to, Google cloud®, IBM cloud®, Microsoft Azure®, and so on. The database arrangement may store the received data in a structured or unstructured form or in a combination thereof.

Furthermore, the uncurated and/or the curated content is segregated before being stored in the database arrangement. Advantageously, having a system that stores the segregated uncurated and/or curated within a database, significantly reduces the operational burden and ownership costs for the client. In accordance with an embodiment of the present disclosure, the segregation of uncurated and/or curated content is done manually by a super administrator user. In another embodiment, the present disclosure may automatically segregate the uncurated and/or curated content, using the software, such as but not limited to, Oracle Argus Insight®, and Infonovum®. Optionally, the uncurated and/or curated content is segregated based on their various attributes, such as but not limited to, industry content, practice content, unique content, clientele, practice portfolios, and so on.

Throughout the present disclosure, the term "super administrator" may be a natural person who has the authority to upload, download, remove, or modify any content stored in the database arrangement. Furthermore, the super administrator has the authority to grant, deny, or revoke the access rights of any user having access to the content stored in the database arrangement.

Throughout the present disclosure, the term "data processing arrangement" refers to an arrangement of one or more processors that performs various operations. Optionally, the data processing arrangement includes any physical computational entity, such as but not limited to Intel Xeon®, Intel®, Pentium®, Intel Celeron®, Intel, Atom®, Arduino, Raspberry Pi, Circuit Playground, or virtual computational entity which are capable of performing the various operations. The virtual computational entity makes one computer act and performs like many computers. Through the virtual computing providers, users can download and use more than one operating system and perform a multitude of functions at the same time through a single mouse click and receive all the benefits of additional programs and hardware without having to purchase or install them on their own computer. The virtual computing allows computer users to remotely access the software applications and processes when they need them. The users gain access via the Internet through a wired or wireless or network server. The examples of virtual computational entities include, but are not limited to, HP LeftHand Storage Systems, HP 3PAR Storage Systems, IBM Cloud virtual compute, and Microsoft Azure.

Moreover, it will be appreciated that the data processing arrangement can be implemented by way of a single hardware processor. The data processing arrangement can alternatively be implemented by way of a plurality of hardware processors operating in a parallel or distributed architecture. As an example, the data processing arrangement may also include components such as memory, a network adapter, and the like, to store, process, and access the information pertaining to the document and to communicate the processed information to other computing components, for example, the user interface or the database arrangement in order to curate the relevant content to the user.

Throughout the present disclosure, the term "secure access" refers to a controlled access wherein only the authorized user can access the content stored in the database arrangement. Particularly, secure access refers to any security policy, solution, strategy, or process that exists to prevent unauthorized access to the user's network, its resources, or any confidential or sensitive content. In the present disclosure, the secure access to the uncurated and/or curated content stored in the database arrangement is provided to a user using Quantiphi LDAP (Google Gmail credentials), based on the pre-defined rights of the user. In addition to this, the pre-defined rights of the user may be based on the designation of the user (such as, but not limited to, administrator, super administrator) in the organization, and/or department of the user in the organization, and/or project allocated to the user, and/or database access authorized by the organization. Furthermore, the pre-defined rights of the user may include the level of access to the content stored in the database arrangement.

Throughout the present disclosure, the term "user" refers to a natural person authorized to interact with the system of the present disclosure. Optionally, the user includes at least one of: a normal user, a business unit administrator, an administrator, or a super administrator.

Throughout the present disclosure, the term "relevant content" refers to the content required by the user for a particular use. Optionally, the relevant content may include content searched by the user. Optionally, the relevant content may include the content which may be useful to a user.

Throughout the present disclosure, the term "desired format" refers to a format of representation of content or information or data which is required by the user in an easy-to-read format. Optionally, the desired format may include, but is not limited to at least one of: presentation, slides, decks, word files, portable document files, and so forth.

In an embodiment, the system comprises a user interface acting as an interface between the user and the system. In other words, the user interface provides a platform for the user to interact with the system. In another embodiment, the data processing arrangement receives the at least one user input in the form of user defined workflow pathways and provides output to the user in the desired format, wherein the user defined workflow pathways comprise uploading curated content, searching curated content and searching uncurated content. Optionally, the user interface receives input from the user regarding his requirement of the content. Similarly, the user interface provides an output-corresponding to the requirement of the user from the system to the user in the desired format. In another embodiment, the user interface may be a graphical user interface configured to receive inputs from the user and provide the output to the user in a legible and efficient manner. The output provided by the user interface includes, but is not limited to, relevant content to the user, suggestions, and feedback section to collect the feedback from the user pertaining to any content stored in the database arrangement.

In an embodiment, the identification of content relevant to the user from the uncurated and/or the curated content stored in the database arrangement is done by data processing arrangement using fuzzy logic, based on the input received from the user. Beneficially, the relevant content identification using fuzzy logic efficiently automates the process of accurately identifying the relevant content and eliminates any content duplicacy. Furthermore, using the fuzzy logic in the content identification makes the system more robust where no precise inputs are required, and it enables the system to accommodate several types of inputs including vague, distorted, or imprecise data. In accordance with an embodiment of the present disclosure, the identification of content relevant to the user comprises searching the relevant content in the database arrangement using at least one of, but not limited to: predefined classifications, keywords, and/or objects.

In an embodiment, the predefined classification includes the classification of content based on industry type, business practice, case studies, clientele, industry landscapes, and so forth. The keywords may include the text present in the content and synonyms of the text present in the content. The objects may include the logos and/or images and/or diagrams and/or graphs and/or illustrations present in the content.

In another embodiment, the data processing arrangement is further configured to compile the relevant content in the desired format, before providing the relevant content to the user. Throughout the present disclosure, the term "compile"

refers to collecting information and arranging it in the form of a list, table, etc. Particularly, "compile" refers to presenting the content in the desired format to a user by assembling the information collected from different repositories present in the database arrangement.

In another embodiment, the term "target location" refers to the location in the database arrangement where the identified content, based on the user's requirement is compiled and stored by the data processing arrangement. In the present disclosure, once the content is curated in the desired format the user will receive mail from the data processing arrangement with a link to the target location where the curated content is stored. In addition to this, the target location may be a folder or list or table, etc.

In an embodiment, the uncurated and/or the curated content comprises a finished and/or an unfinished content. Throughout the present disclosure, the term "finished content" refers to the content that is ready to use by the user and requires no further updating or modification. Throughout the present disclosure, the term "unfinished content" refers to the content that requires further updating and/or editing from the user.

In yet another embodiment, the data processing arrangement is further configured to enable the user to suggest and/or make changes in the uncurated and/or the curated content stored in the database arrangement using the user interface.

Optionally, the data processing arrangement is configured to enable the user to upload the uncurated and/or the curated content on the user interface in order to store the uncurated and/or curated content in the database arrangement.

Optionally, the uncurated and/or the curated content is segregated before being stored in the database arrangement. The segregation of content is done manually, based on the various attributes of the content. Advantageously, having a system that stores the segregated uncurated and/or curated within a database arrangement, significantly reduces the operational burden, complexity in retrieving the relevant content, the time investment in retrieving the relevant content, and ownership costs for the user. The uncurated and/or curated content is segregated based on their various attributes, such as but not limited to, industry content, practice content, unique content, clientele, practice portfolios, and so forth.

Optionally, segregation of the uncurated and/or curated content is done by using the software, such as but not limited to, Oracle Argus Insight® and Infonovum®.

Optionally, the data processing arrangement is configured to receive the input from the user via the user interface.

Optionally, the identification of the content relevant to the user comprises searching the relevant content in the database arrangement using at least one of: predefined classification, keywords, and/or objects.

Optionally, the content relevant to the user comprises content required by the user and/or content searched by the user.

Optionally, the data processing arrangement is configured to receive a feedback from the user, wherein the feedback is used to modify and/or delete and/or update the uncurated and/or the curated content stored in the database arrangement.

Optionally, the data processing arrangement is configured to receive the user's selection of at least one content from the uncurated and/or the curated content stored in the database arrangement to curate the content relevant to the user. In an example, the database arrangement is configured to receive the user's selection of curated content so as to curate the already curated content, such as selecting one or more slides from an already curated or already created deck of the plurality of slides. Herein, the system involves selecting one or more slides to form a deck of slides from the already created deck of the plurality of slides.

Optionally, the data processing arrangement is configured to dispatch a communication to the user with the target location of the curated content. Advantageously, it enables the user to efficiently and effortlessly locate and retrieve the content relevant to him, from the database arrangement. Furthermore, the communication having the target location of relevant content stored in the database arrangement is significantly beneficial in such cases where the database arrangement has a huge amount of content stored therein, as it reduces the time and efforts required to identify and retrieve the relevant content from the database arrangement. In addition to this, it also minimizes the probability of errors in identifying and retrieving the relevant content from the database arrangement having a huge amount of content stored therein.

The present disclosure also relates to the method as described below. Various embodiments and variants disclosed above apply mutatis mutandis to the method.

In a second aspect, embodiments of the present disclosure provide a method for content curation and collaboration, the method comprising:

storing, using a user interface, an uncurated and/or a curated content in a database arrangement, wherein the uncurated and curated content is segregated before being stored;

providing, using a data processing arrangement, secured access of the uncurated and/or the curated content stored in the database arrangement, to the at least one user based on pre-defined rights of the at least one user;

receiving, using the user interface, at least one input from the at least one user;

identifying, using the data processing arrangement, at least one content relevant to the at least one user, from the uncurated and/or the curated content stored in the database arrangement, using fuzzy logic, based on at least one input received from the at least one user; and compiling, using the data processing arrangement, the content relevant to the user at a target location;

providing, using the data processing arrangement, the relevant content to the user in a desired format via the user interface.

Optionally, the method comprises enabling the user to upload the uncurated and/or the curated content on the user interface in order to store the uncurated and/or curated content in the database arrangement.

Optionally, the uncurated and/or the curated content is segregated before being stored in the database arrangement. The segregation of content is done manually, based on the various attributes of the content. Advantageously, having a system that stores the segregated uncurated and/or curated within a database arrangement, significantly reduces operational burden, complexity in retrieving the relevant content, time investment in retrieving the relevant content and ownership costs for the user. The uncurated and/or curated content is segregated based on their various attributes, such as but not limited to, industry content, practice content, unique content, clientele, practice portfolios, and so on.

Optionally, in another embodiment, segregation of the uncurated and/or curated content is done by using the software, such as but not limited to, Oracle Argus® Insight and Infonovum®.

Optionally, the method comprises receiving the input from the user via the user interface.

Optionally, the identification of the content relevant to the user comprises searching the relevant content in the database arrangement using at least one of: predefined classification, keywords, and/or objects.

Optionally, the content relevant to the user comprises content required by the user and/or content searched by the user.

Optionally, the method comprises receiving a feedback from the user, wherein the feedback is used to modify and/or delete and/or update the uncurated and/or the curated content stored in the database arrangement.

Optionally, the method comprises receiving the user's selection of at least one content from the uncurated and/or the curated content stored in the database arrangement to curate the content relevant to the user.

Optionally, the method comprises dispatching a communication to the user with the target location of the curated content. Advantageously, it enables the user to efficiently and effortlessly locate and retrieve the content relevant to him, from the database arrangement. Furthermore, the communication having the target location of relevant content stored in the database arrangement is significantly beneficial in case the database arrangement has a huge amount of content stored therein, as it reduces the time and efforts required to identify and retrieve the relevant content from the database arrangement. In addition to this, it also minimizes the probability of errors in identifying and retrieving the relevant content from the database arrangement having a huge amount of content stored therein.

In accordance with an embodiment of the present disclosure, the system of the present disclosure functions in the below described three modes—Pick and Go, Explorer, and Deals Library:

Pick and Go—The Pick and Go mode allows the user to select a specific repository in the database arrangement for content searching and accessing the required content which was already prepared, curated, and stored in the content repository that is present in the database arrangement. Further, the admin-level user can edit the content stored in the repository present in the database arrangement. Moreover, the user is allowed to search the already stored content in the repositories along with making suggestions/comments on the content stored in the specific repository present in the database arrangement.

Explorer—The Explorer mode allows the user to provide the content requirement to the system in the form of user inputs on the user interface and the system will curate, collate and prepare content based on the user's requirement in an automated manner. The system processes the stored data and the metadata to automatically manage content based on the user's requirement. The created content is presented to the user in the format desired by the user.

Deals Library—The deals library mode allows the user to engage and collaborate in an unfinished content. The Deals library enables user to collaborate cross-functionally in a business environment wherein the users can collaborate to finish the unfinished content.

In an exemplary embodiment, the system provides secure access to the user for accessing the content stored in the database arrangement. The database arrangement may comprise a specialized repository for securely storing the log in credentials of the user. The data processing arrangement identifies the type of user which is accessing the database arrangement and based on the type of user enable different level of actions to the user. For example, the user can be the normal user, the business unit administrator, the administrator, or the super administrator. The user role enables rule-based content access. The database arrangement may store user-intuitive video guides comprising recorded videos with voice over stored on blob storage at the back-end for providing a tutorial to the user, such that the user learns to use the system in a productive manner.

Furthermore in another embodiment, the data processing arrangement generates the user's profile, and the database arrangement stores the generated user profile to save the content creation and content access history of the user. The content creation and content access history of the user enable the system to provide a personalized workspace to the user storing the list of all the content that the user has created on the platform, with embedded content URLs for quick access. Optionally, a structured repository reference in the database arrangement is used for storing the user's historical data and information/metadata about the content created by the user on the platform in the Content Explorer mode. The database arrangement also stores a list of recently created unfinished content for easy access. The unfinished content is stored in a separate structured repository created in the database arrangement, which is maintained manually by the super administrator user. Furthermore, the users would have access permissions based on the role assigned to them. Moreover, a backend repository is maintained in the database arrangement with a list of user mail IDs and their required access permissions.

In an embodiment, for the Pick and Go mode of the system, the user chooses which data repository in the database arrangement to search for the content relevant to him. Optionally, the user searches for finished content in the Pick and Go mode. Optionally, the database arrangement is configured to maintain separate data repositories for each content type/section. Once the user selects a particular relevant section, the specific dataset stored in the associated repository gets loaded in the backend. Optionally, the user is enabled to select the specific content related to a specific industry/practice/asset which is relevant to the user's requirements. The database processing arrangement queries the specific industry/practice/asset table from the specific repository stored in the database arrangement. Optionally, the user is enabled to explore the submodalities for the specific industry segment. To enable the exploration of submodalities, quick links providing access to various unfinished content are made available by the business unit administrator, the administrator, or a super administrator. Optionally, the data processing arrangement is configured to run the user-specific query to query the specific content from the identified repository and table. Optionally, the URLs are embedded onto the content presented in the desired format wherein clicking on the URLs enables the user to open the required unfinished content on the next tab in the user interface. The data processing arrangement queries the list of URLs and document tiles from the backend table stored in the database arrangement. In an embodiment, the data processing arrangement enables the user to perform at least one of actions comprising addition, modification and deletion of the curated and/or uncurated content stored in the database arrangement. In a particular embodiment, the data processing arrangement also allows user restricted features which include the following:

ADD: Enables administrator to add a new modality to their industry/practice/Asset; also enables users to add unfinished content to existing content under the specific modalities;

MODIFY: Change existing content by editing the title of a document/modality, or updating the unfinished content with a new URL;

DELETE: Delete any old obsolete content.

Optionally, each of the action triggers a SQL query at the backend of the database arrangement that updates the database arrangement with the updated content.

In an embodiment, the user is enabled to search across Industry/Practice/Assets for a specific unfinished content for easy and quick access. The search creates a list of search results which is then provided to the user on the user interface wherein the user may interact with the list by clicking on it to be redirected to the content directly. Optionally, the search is a simple keyword-based search, that triggers the SQL query to do a fuzzy logic match on the name of the unfinished and/or finished content and search through all the repositories present in the database arrangement.

In an embodiment, the user is enabled to make a suggestion to the content on a specific page. Optionally, there is a suggestion button for each industry/practice/asset on the user interface. Optionally, putting a suggestion on the content triggers an email to the respective section owner, and advantageously keeps the suggestion highlighted on the page to enable other users to view it and keep track of the comment made. Optionally, the suggestion functionality works on an in-built mailing library in node js, called as "node mailer" that triggers emails to the respective owners of the sections to update the content. Optionally, the track of the comments is maintained in a SQL table.

In another embodiment, in the Explorer mode of the system, the user is enabled to select the section that is displayed on the user interface. The user may find the content in repositories of Industry/Practice/Assets/Case Study and so forth. Optionally, the user can also find an underlying subsection needed to find the required content. Optionally, the content is maintained in a structured repository present at the backend of the database arrangement, wherein the tabular data, list of industries, packages, etc. are stored in a table and are queried. The images and/or thumbnails are stored in blob storage in the database arrangement, and a script is written to retrieve the blob storage URLs and store them in a SQL table in the database arrangement for further easy retrieval.

Optionally, after the selection of the section/subsection, the user is enabled to scroll through the thumbnails displayed on the user interface. Optionally, the thumbnails from the specific section are only displayed on the user interface. Advantageously, the data processing arrangement works in such a manner that while fetching all the documents, and thumbnails, the load time to fetch the relevant data elements is reduced by a great extent.

Optionally, the user may view the blown-up version of the content/thumbnail by clicking on the "I" button on the top right-hand corner of the content to view the blown-up version of the content. The user may also view any other metadata like "owner of the content", "any comments" etc. by clicking on the "I" provided therein. Furthermore, the user can select a single content or all the content in the selected section. Also, the user may select the specific content as well based on the requirement. The "blown-up" is referred to as zooming of the content and images and is also known as the "front end zoom feature". Optionally, the front-end zoom feature is developed using angular. Selection of a single content or all content is also done using angular as a front-end feature.

Optionally, the selection of a single/all content in the section facilitates the user to preview the overall content. Optionally, the preview provides a full screen blown up version covering the overall flow of the content, with a side arrow that resembles "presentation mode". Advantageously, this helps users to visualize the flow of their finalized content in their desired format.

Optionally, the selection of the content gives the users the right to edit and rearrange the content/thumbnails in the preferred order. Optionally, the user may drag and rearrange images or content in a preferred manner. Optionally, the actions are executed as a front-end feature and are developed as angular.

Optionally, the user is enabled to click on the finalize button to store all the selected content along with their metadata in an array after making changes to the content such as rearranging and editing content.

Optionally, the addition of a blank deck URL is done by the user wherein it comprises validation on the URL as well to identify any invalid URLs entered by the URLs. Optionally, the location of the target URL is saved herein by the data processing arrangement.

In an embodiment, the user is enabled to name the content that the user has created in the desired format. The created content is stored in as the user's personal record. The name of the content is stored in a SQL database to display on the landing profile page of the user. Optionally, the user is enabled to explore the rest of the platform while the content is getting created in the backend while the user waits for the content to be created in the desired format and sent. Once the content is created in the desired format, the user will receive mail from the data processing arrangement with a link to the created content. The data processing arrangement as disclosed herein triggers an API created at the backend using Google App script which accepts inputs such as an array of images and metadata, and the target deck URL. The data processing arrangement also employs a custom script that works using Google slides to create the new content, or append the selected content to the end of an existing content in the desired format. Advantageously, said the operation is performed with a single click by the user. Optionally, the content is then copied from the source to the destination. Advantageously, any change in the source would reflect across all the target content and ensure the content is up to date.

Optionally, the user is further enabled to select case studies and add them at the end of the content in his desired format. Optionally, a table of case studies is created that acts as an index table to all the case studies added. More optionally, a subscript in the API (described above) that adds the case study content at the end, works on a content linking logic to create an appendix table linking case studies to the respective content as well.

In an embodiment, the data processing arrangement identifies, at least one content relevant to the user, from the uncurated and/or the curated content stored in the database arrangement, via an index stored in a search database, in response to the at least one input received from the user, wherein the index comprises of association between a plurality of content, a plurality of associated metadata and a plurality of associated thumbnails. Herein, the plurality of content comprises at least one of curated and uncurated content. In another embodiment, the data processing arrangement is configured to store the index in one or more elastic search databases. Optionally, the data processing arrangement is configured to employ big query for storing and creating the index comprising of associations between the plurality of content, the plurality of associated metadata and the plurality of associated thumbnails. Optionally, the data processing arrangement generates the plurality of thumbnails from the curated and/or the uncurated content stored in the database arrangement. More optionally, the data processing arrangement generates the plurality of thumbnails by extracting one or more features of the curated and/or uncurated content via at least one of an object recognition algorithm, an image recognition algorithm and a text recognition algorithm. Furthermore in an embodiment, the data processing arrangement extracts the plurality of metadata by processing the generated plurality of thumbnails via vision API.

Optionally, the user can search through the content stored in the database arrangement by surfing through the thumbnails available by a simple search mechanism. Further, the search can be narrowed down to surf through a specific database to narrow down the search results. All the images have some metadata associated with them. Optionally, the metadata is the content in the images including text, title, etc. Optionally, these are extracted and stored in an Elastic search database with the required indexing. Optionally, the search tool does a keyword match/fuzzy logic on the metadata on the Elastic search database and retrieves the result based on a custom rule which associates more weight on the title of a slide (in order to improve ranking). Since the process for metadata generation is automated, it becomes extremely crucial to prioritize which metadata to be focused on. Hence, the data processing arrangement is using Elastic search libraries and tools to prioritize more on the Headings as opposed to other content. Further, some custom organization-specific logic is also applied to show up the prioritized content higher in the ranked list.

Optionally, the image content level metadata is generated. The moment content is updated onto the cloud, it triggers another Cloud function script that passes the images through a Vision API-based OCR pipeline to extract metadata from an image and stores all the metadata onto the Elastic search indexes.

As opposed to the common convention, where taggers and annotators sit to read through slides and extract relevant metadata in terms of the title or description of the slide, the present system uses vision API (off the shelf Google's Vision API) to perform OCR and extract all the textual content on the content(slide). This also identifies image logos, and associated details with some content that is not in standard textual format, for example, the logo of an "Angular/Node JS", the term Node JS is extracted and stored as metadata.

In yet another embodiment, for the Explorer mode of the system, the user flow to navigate through the user interface is very similar to the Pick and Go mode, and the user can select the specific industry which results in SQL queries being run to fetch the required content. Optionally, the user selects client type and a list of clients with active ongoing projects that are displayed to the user on the user interface. Optionally, the user may also be provided with a list of non-active clients and/or prospective clients. Optionally, the data processing arrangement is configured to run SQL queries with the COUNT function to classify the projects into converted and other categories. Clicking on the specific client opens up a modal window on the user interface that contains the following:

LEFT: Metadata related to the client including details like who added the client logo, which region it belongs to, etc.

RIGHT: The list of project threads being delivered for the client; also indicates which project is converted and which is not (converted projects are higher up the order).

Optionally, the modal window contains a list of additional metadata associated with the client and the project. Optionally, the SQL queries and array sorting methods are used to prioritize the order of projects. Optionally, a user can access all the relevant content added by the SPOC by clicking on the specific project under a client, and clicking on the content opens up in an adjacent tab. In an embodiment, the data processing arrangements run SQL queries containing detailed lists, and embedded links of the content. Optionally, the data is stored in an MQ SQL database at the backend. Advantageously, the deals library mode also contains user-restricted features similar to the Pick and Go module. Moreover, the search works similar to the Pick and Go mode.

The method of content curation and collaboration comprises enabling secured access of a user to an uncurated and/or a curated content stored in a database arrangement, identifying content relevant to the user from the uncurated and/or the curated content stored in the database arrangement, based on at least one input received from the user and providing the relevant content to the user in the desired format.

In another embodiment, the uncurated and/or the curated content comprises a finished and/or an unfinished content.

In yet another embodiment, the identification of content relevant to the user comprises searching the relevant content in the database arrangement using at least one of: predefined classification, keywords, and/or objects.

In yet another embodiment, the method comprises compiling the relevant content in the desired format, before providing the relevant content to the user.

In yet another embodiment, the method comprises enabling the user to suggest and/or make changes in the uncurated and/or the curated content stored in the database arrangement.

DETAILED DESCRIPTION OF DRAWINGS

Referring to FIG. 1, there is shown a schematic illustration of a system 100 for content curation and collaboration, in accordance with an embodiment of the present disclosure. The system 100 comprises a database arrangement 102 that is configured to store a uncurated and/or a curated content. The system 100 further comprises a data processing arrangement 104 communicably coupled to the database arrangement 102.

Figure 2:
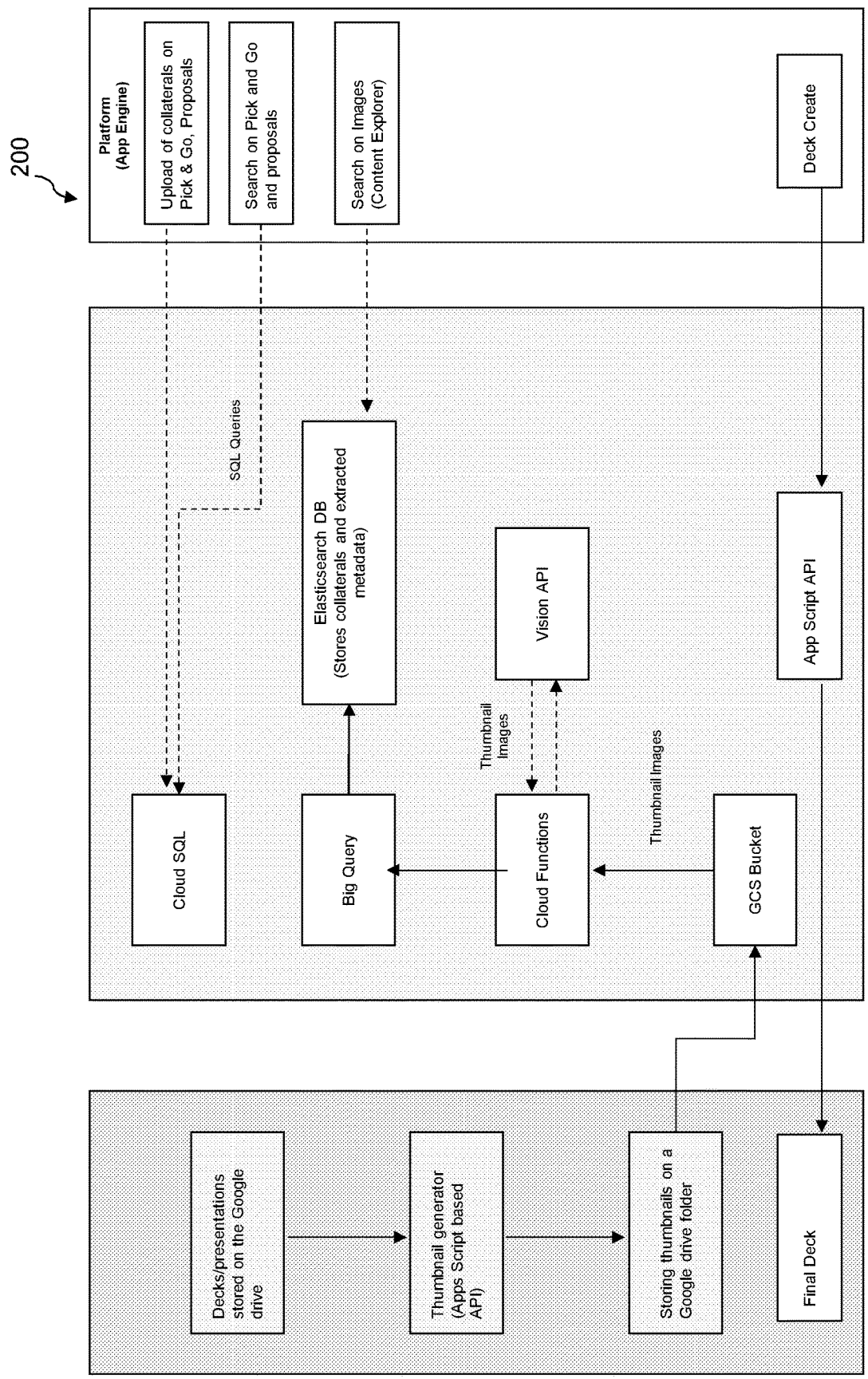
FIG. 2 is a schematic illustration of the technical architecture of the system, in accordance with an embodiment of the present disclosure.

Referring to FIG. 2, there is shown a schematic illustration 200 of the technical architecture of the system 100, in accordance with an embodiment of the present disclosure. The system 100 comprises a user interface as a platform or app engine. After the secured access to the system 100, the user can interact with the platform for uploading the finished and/or the unfinished content in the form of a collateral in the Pick and Go mode of the system. The user is also enabled to search the Pick and Go mode to retrieve the previously uploaded finished and/or unfinished content. The user's action of uploading or searching in the Pick and Go mode triggers SQL queries in the cloud SQL to respond to the user's action. Based on the user's action, the relevant content is either uploaded to the database arrangement or retrieved from the database arrangement. In the Explorer mode, the user is enabled to search on the content present in the form of images using the metadata of the content (images). The user's search of the images triggers Elastic search database wherein the finished and/or the unfinished content is stored along with the extracted metadata. In the backend, the content (in the form of decks or presentations) is stored on the database arrangement. In an embodiment, the data processing arrangement generates the plurality of thumbnails from the curated and/or the uncurated content stored in the database arrangement. Furthermore, in another embodiment, the data processing arrangement generates the plurality of thumbnails by extracting one or more features of the curated and/or uncurated content via at least one of an object recognition algorithm, an image recognition algorithm and a text recognition algorithm. A thumbnail generator which is an Apps Script-based API runs on the content to generate thumbnails relevant to the content. The generated thumbnails are stored in the database arrangement in the folders specified for the thumbnails. The folders specified for the thumbnails in the database arrangement are linked to Google Cloud Service bucket to enable querying of the thumbnails. The Google Cloud Service bucket provide the thumbnails to the Cloud Functions where the Vision API process the thumbnails generating the metadata and identifying the information stored in the thumbnails. The processed thumbnails are provided to the Big Query which in turns provides the processed thumbnails to the Elastic search database for identifying relevant content to the user in the Explorer mode. After the identification of the relevant content, the user clicks "Deck Create" on the platform which in turn triggers App Script API in the data processing arrangement which creates a deck and stores the created deck in the database arrangement.

Figure 3:
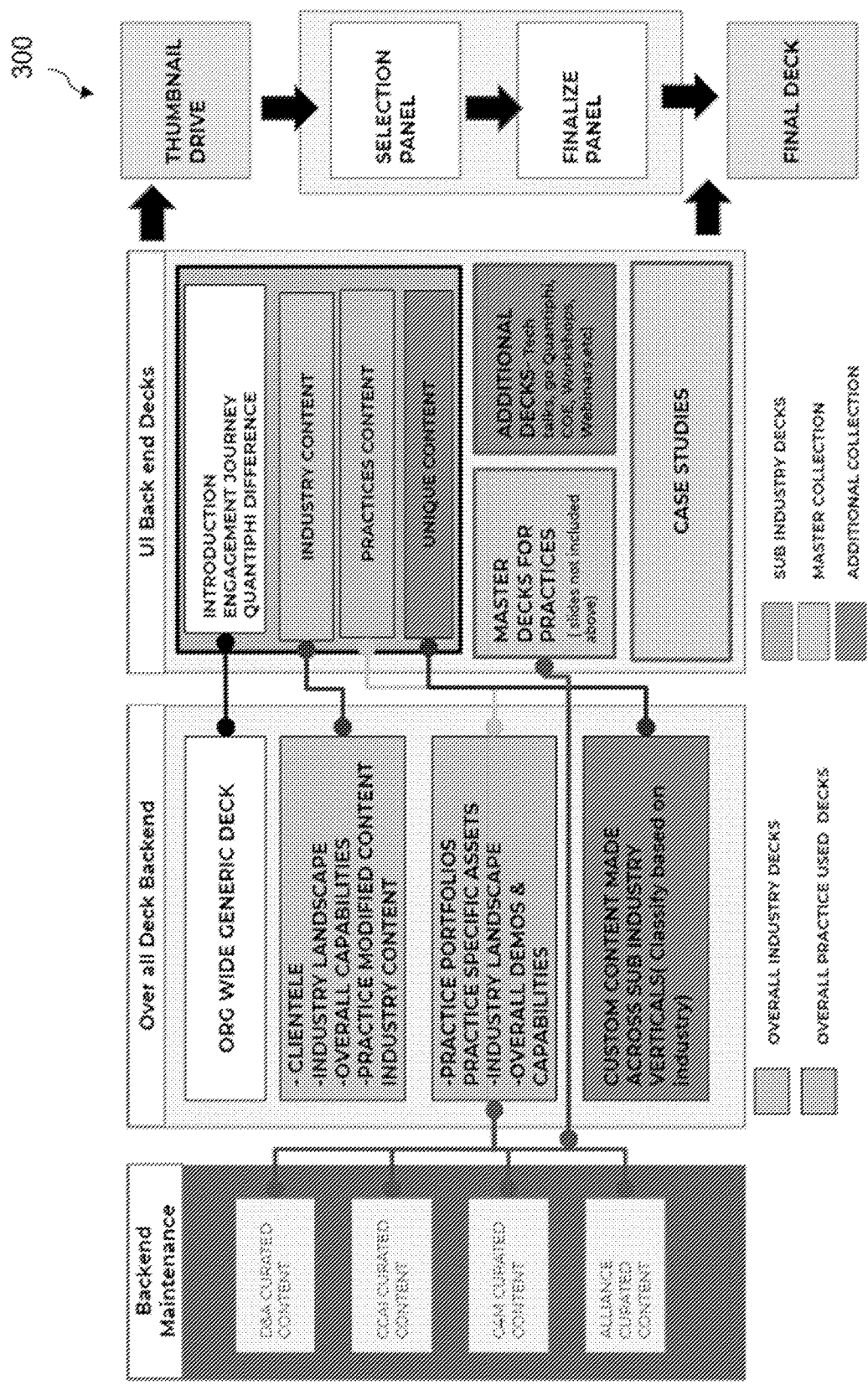
FIG. 3 is a schematic illustration of the architecture of content movement, in accordance with an embodiment of the present disclosure.

Referring to FIG. 3, there is shown a schematic illustration 300 of architecture of content movement in the system 100, in accordance with an embodiment of the present disclosure. In the Backend Maintenance of the database arrangement, there are stored at least one of: a Data and Analytics curated content, Contact Center Artificial Intelligence curated content, Cloud for Marketing curated content, and Google Alliance curated content. The user interface provides option to the user to explore different categories of the content stored in the database. The different categories of the content include at least one of: an organization wide generic content, industry related content, practice related content, unique content, master content for practices, additional content, and case studies. The organization wide generic content comprises introduction, engagement journey and business capabilities. The industry related content comprises clientele, industry landscape, overall capabilities of the business in the particular industry and practice modified industry content. The practice content comprises practice portfolios, practice specific information, industry landscape and overall demos & capabilities. The unique content comprises custom content made across sub industry verticals which is classified based on the related industry. The master content comprises the content stored in the backend maintenance. The additional content comprises talks, webinars, workshops and so forth. The content moves to the thumbnail drive for the thumbnail generation. After the generation of thumbnails, the content is available for selection in the selection panel. After the selection, the content can be finalized in the finalize panel. The finalization of the content generates final content relevant to the user in the desired format.

Figure 4:
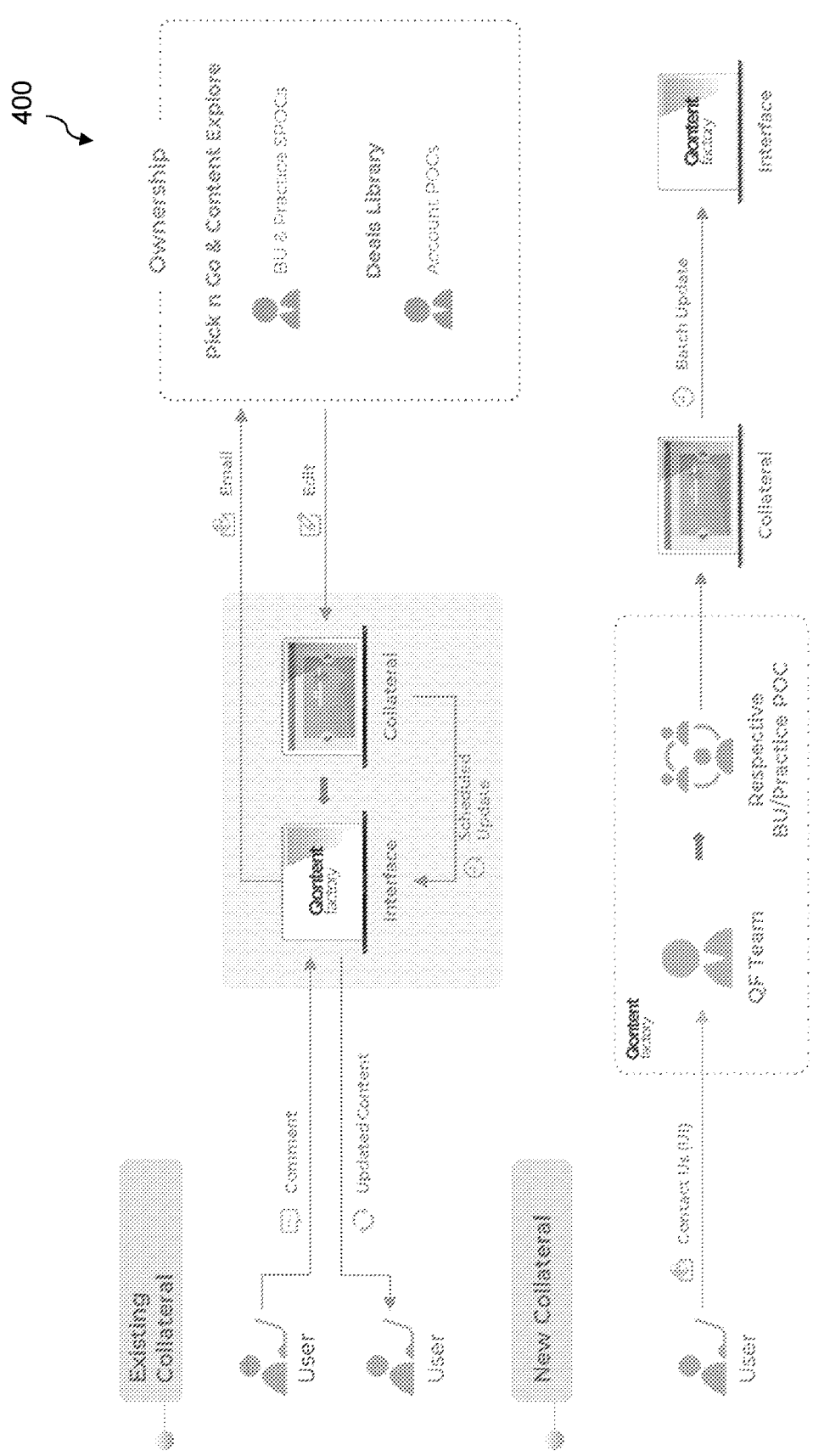
FIG. 4 is a schematic illustration of content change management, in accordance with an embodiment of the present disclosure.

Referring to FIG. 4, there is shown a schematic illustration 400 of content change management in the system 100, in accordance with an embodiment of the present disclosure. For the existing content stored in the database arrangement 102 of the system 100, a user comments on the existing content using the user interface of the system where the content is presented to the user. The comment on the content triggers email to the owner of the content (administrator user) for review. After the review of the content, the administrator user approves the change in the content or edit the content. The action of approval or edit from the administrator triggers content update. After the update, the users can access the updated content. For storing a new content in the database arrangement 102 of the system 100, a user can upload the content on the user interface. The administrator user reviews the uploaded content and approves or decline the addition of content to the database. The approval of addition from the administrator updates the content in the database arrangement 102 with the newly added content.

Figure 5:
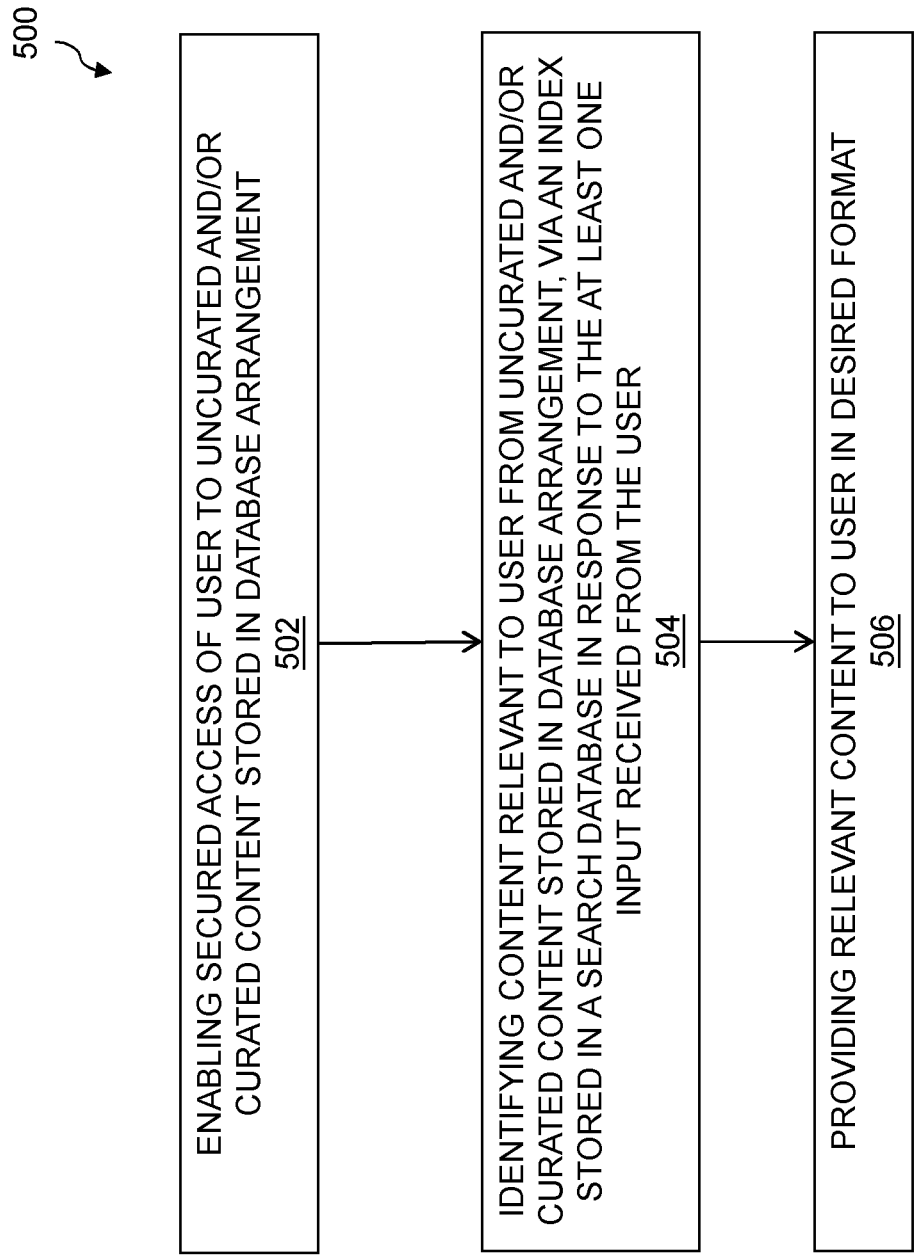
FIG. 5 is a schematic illustration of a method for content curation and collaboration, in accordance with an embodiment of the present disclosure.

Referring to FIG. 5, there are shown steps of a method 500 for content curation and collaboration, in accordance with an embodiment of the present disclosure. At step 502, secured access of a user is enabled to an uncurated and/or a curated content stored in a database arrangement. At step 504, content relevant to the user is identified from the uncurated and/or the curated content stored in the database arrangement, via an index stored in a search database in response to the at least one input received from the user. At step 506, the relevant content is provided to the user in a desired format.

Figure 6:
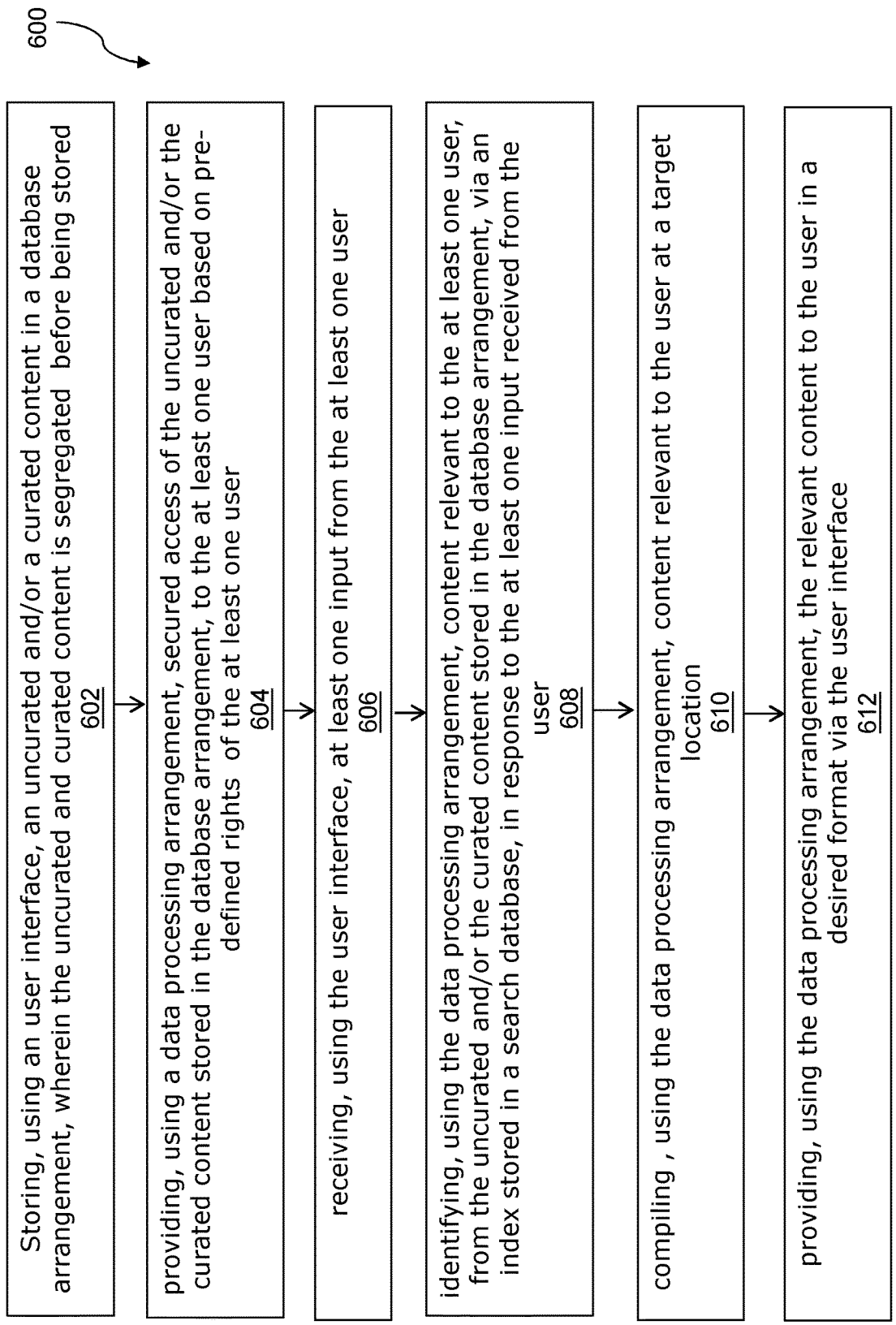
FIG. 6 is a schematic illustration of the method of providing relevant content to at least one user, in accordance with an embodiment of the present disclosure.

Referring to FIG. 6, there are shown detailed steps 600 of the method 500 for providing relevant content to at least one user, in accordance with an embodiment of the present disclosure. At step 602, using a user interface, an uncurated and/or a curated content is stored in a database arrangement, wherein the uncurated and curated content is segregated before being stored. At step 604, using a data processing arrangement, secured access of the uncurated and/or the curated content stored in the database arrangement is provided, to the at least one user based on pre-defined rights of the at least one user. At step 606, at least one user input is received using the user interface. At step 608, content relevant to the at least one user, from the uncurated and/or the curated content stored in the database arrangement, is identified by the data processing arrangement via an index stored in a search database in response to the at least one input received from the user. At step 610, the data processing arrangement compiles the content relevant to user at a target location. At step 612, content relevant to user is provided by the data processing arrangement via the user interface.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for relevant content curation, the system comprising:
   a database arrangement configured to store an uncurated and/or a curated content, using a user interface, wherein the uncurated and curated content is segregated before being stored; and
   a data processing arrangement communicably coupled to the database arrangement, wherein the data processing arrangement is configured to:
      enable, secured access of a user to the uncurated and/or the curated content stored in the database arrangement based on pre-defined rights of the user;
      identify, at least one content relevant to the user, from the uncurated and/or the curated content stored in the database arrangement, via an index stored in a search database, in response to the at least one input received from the user, wherein the index comprises of association between a plurality of content, a plurality of associated metadata and a plurality of associated thumbnails;
      compile, the content relevant to the user at a target location; and
      provide, the relevant content to the user in a desired format via the user interface.

2. The system of claim 1, wherein the data processing arrangement is configured to store the index in one or more elastic search databases.

3. The system of claim 1, wherein the plurality of content comprises at least one of curated and uncurated content.

4. The system of claim 1, wherein the data processing arrangement identifies the relevant content from the curated and/or the uncurated content via fuzzy logic.

5. The system of claim 1, wherein the data processing arrangement enables the user to perform at least one of actions comprising addition, modification and deletion of the curated and/or uncurated content stored in the database arrangement.

6. The system of claim 5, wherein at least one of the actions performed by the data processing arrangement triggers a SQL query at backend of the database arrangement that updates the database arrangement.

7. The system of claim 1, wherein the data processing arrangement generates the plurality of thumbnails from the curated and/or the uncurated content stored in the database arrangement.

8. The system of claim 1, wherein the data processing arrangement generates the plurality of thumbnails by extracting one or more features of the curated and/or uncurated content via at least one of an object recognition algorithm, an image recognition algorithm and a text recognition algorithm.

9. The system of claim 1, wherein the data processing arrangement extracts the plurality of metadata by processing the generated plurality of thumbnails via vision API.

10. The system of claim 1, wherein the data processing arrangement receives the at least one user input in the form of user defined workflow pathways and provides output to the user in the desired format, wherein the user defined workflow pathways comprise uploading curated content, searching curated content and searching uncurated content.

11. The system of claim 1, wherein the data processing arrangement is configured to employ big query for storing and creating the index comprising of associations between the plurality of content, the plurality of associated metadata and the plurality of associated thumbnails.

12. The system of claim 1, wherein the data processing arrangement is configured to enable the user to upload the uncurated and/or the curated content on the user interface for storing the uncurated and/or the curated content in the database arrangement.

13. The system of claim 1, wherein the uncurated and/or the curated content is segregated manually.

14. The system of claim 1, wherein the data processing arrangement receives the input from the user using the user interface.

15. The system of claim 1, wherein the identification of content relevant to the user comprises searching the relevant content in the database arrangement using at least one of: predefined classification, keywords, and/or objects.

16. The system of claim 1, wherein the data processing arrangement receives a feedback from the user, wherein the feedback is used to modify the uncurated and/or the curated content stored in the database arrangement.

17. The system of claim 1, wherein the data processing arrangement receives a user's selection of at least one content from the uncurated and/or the curated content stored in the database arrangement to curate the content.

18. The system of claim 1, wherein the data processing arrangement dispatches a communication to the user with a target location of the curated content.

19. The system of claim 1, wherein the relevant content comprises a content required by the user and/or a content searched by the user.

20. A method of providing relevant content to at least one user, wherein the method comprises:
    storing, using a user interface, an uncurated and/or a curated content in a database arrangement, wherein the uncurated and curated content is segregated before being stored;
    providing, using a data processing arrangement, secured access of the uncurated and/or the curated content stored in the database arrangement, to the at least one user based on pre-defined rights of the at least one user;
    receiving, using the user interface, at least one input from the at least one user;
    identifying, using the data processing arrangement, at least one content relevant to the user, from the uncurated and/or the curated content stored in the database arrangement, via an index stored in a search database, in response to the at least one input received from the user, wherein the index comprises of association between a plurality of content, a plurality of associated metadata and a plurality of associated thumbnails;
    compiling, using the data processing arrangement, the content relevant to the user at a target location, and
    providing, using the data processing arrangement, the relevant content to the user in a desired format via the user interface.

21. The system of claim 20, wherein the method comprises storing the index in one or more elastic search databases.

22. The system of claim 20, wherein the plurality of content comprises at least one of curated and uncurated content.

23. The method of claim 20, wherein the method comprises identifying the relevant content from the curated and/or uncurated content via fuzzy logic.

24. The method of claim 20, wherein the method comprises enabling the user to perform at least one of actions comprising adding, modifying and deleting the curated and/or uncurated content stored in the database arrangement.

25. The method of claim 24, wherein at least one of the actions performed by the data processing arrangement triggers a SQL query at backend of the database arrangement that updates the database arrangement.

26. The method of claim 20, wherein the method comprises generating the plurality of thumbnails from the curated and/or uncurated content stored in the database arrangement.

27. The method of claim 20, wherein the method comprises generating the plurality of thumbnails by extracting one or more features of the curated and/or uncurated content via at least one of an object recognition algorithm, an image recognition algorithm and a text recognition algorithm.

28. The method of claim 20, wherein the method comprises extracting the plurality of metadata by processing the generated plurality of thumbnails via vision API.

29. The method of claim 20, wherein the method comprises receiving user inputs in the form of defined user workflow pathways and provides output to the user in the desired format, wherein the user-defined workflow pathways comprise uploading curated content, searching curated content, and searching uncurated content.

30. The method of claim 20, wherein the method comprises employing big query for storing and creating the index comprising of associations between the plurality of content, the plurality of associated metadata and the plurality of associated thumbnails.

31. The method of claim 20, wherein the method comprises enabling the user to upload the uncurated and/or the curated content on the user interface for storing the uncurated and/or the curated content in the database arrangement.

32. The method of claim 20, wherein the uncurated and/or the curated content is segregated manually.

33. The method of claim 20, wherein the method comprises receiving the input from the user using the user interface.

34. The method of claim 20, wherein the identification of content relevant to the user comprises searching the relevant content in the database arrangement using at least one of:
predefined classification, keywords, and/or objects.

35. The method of claim 20, wherein the method comprises receiving at least one feedback from the user, wherein the feedback is used to modify the uncurated and/or the curated content stored in the database arrangement.

36. The method of claim 20, wherein the method comprises receiving a user's selection of at least one content from the uncurated and/or the curated content stored in the database arrangement to curate the content.

37. The method of claim 20, wherein the method comprises dispatching a communication to the user with the target location of the curated content.

38. The method of claim 20, wherein the relevant content comprises a content required by the user and/or a content searched by the user.

* * * * *